United States Patent [19]

German

[11] Patent Number: 5,593,793
[45] Date of Patent: Jan. 14, 1997

[54] BATTERY CONTAINER FOR SEVERAL ELECTROCHEMICAL ACCUMULATORS ARRANGED THEREIN

[75] Inventor: Johann German, Weinstadt, Germany

[73] Assignee: Mercedes-Benz AG, Stuttgart, Germany

[21] Appl. No.: 600,614

[22] Filed: Feb. 13, 1996

[30] Foreign Application Priority Data

Feb. 13, 1995 [DE] Germany ............... 195 04 687.0

[51] Int. Cl.$^6$ .................................................. H01M 2/10
[52] U.S. Cl. ..................... 429/62; 429/99; 429/100; 429/72
[58] Field of Search .............................. 429/176, 163, 429/159, 120, 62, 72, 96–100, 148, 149; 180/68.5

[56] References Cited

U.S. PATENT DOCUMENTS 5,212,024  5/1993  Klink et al. .

FOREIGN PATENT DOCUMENTS

4116253C1  6/1992  Germany .

*Primary Examiner*—Anthony Skapars
*Attorney, Agent, or Firm*—Evenson McKeown Edwards & Lenahan, PLLC

[57] ABSTRACT

This invention relates to a battery container which can be fastened in a sealing and detachable manner directly in the supporting floor structure of a body of a vehicle. The battery container is formed of a material, particularly sheet metal, which is ductile also at low freezing temperatures, and is dimensioned such in its wall thickness that, in the case of a crash, although it rips in a defined manner, it does not tear so far that individual cells can fall out of the battery container. In the battery container, the flat sides of inserted cells are spaced with respect to one another by spacers, whereby this clearance becomes available as a bypass duct, strips being arranged in the bypass ducts which project away from the spacer.

13 Claims, 5 Drawing Sheets

BATTERY CONTAINER FOR SEVERAL ELECTROCHEMICAL ACCUMULATORS ARRANGED THEREIN

BACKGROUND AND SUMMARY OF THE INVENTION

This invention relates to battery containers of the general type known from German Patent Document DE 41 16 253.

German Patent Document DE 41 16 253 discloses a battery container for several electrochemical accumulators or battery units, hereafter referred to as "cells" arranged therein. The cell housings of the individual cells, which are electrically connected with one another on the terminal side by means of current bridges, are made of metal so that they have a good heat transmission. This heat transmission is particularly important for the tempering of the cells since the temperature is a decisive criterion for the parameters of the cells. So that the tempering takes place over the whole surface of the cell, bypass ducts are arranged between the flat sides of cells adjoining cell housings, which bypass ducts are bounded by the flat sides of the corresponding cell housings through which a tempering fluid flows. The cell housings are spaced away from one another with respect to their flat sides by spacers made of an electrically insulating material which are arranged in the area of the corners of the cell housings. For supplying the bypass ducts, the battery container also has in its interior an inflow duct fluidly connected with the bypass ducts and an outflow duct arranged on the opposite end of the bypass duct. The mass flow through the bypass ducts supplied in parallel by the inflow duct with tempered fluid must be approximately equal which is why the clear cross-section of the inflow duct is reduced in the flow direction of the fluid flowing through it and the clear cross-section of the outflow duct, which is arranged opposite it with respect to a bypass duct and is fluidly connected with it, is widened in the flow direction.

Despite the advantages of the known battery container, particularly in the case of "breathing cells", thus in the case of cells or electrochemical accumulators which change their volume during the discharge and/or charge, problems occur again and again with respect to the tempering caused by local temperature differences inside the battery container. Furthermore, for accident-related reasons and also for reasons concerning the stability, a metallic container is required as an end container which is generally embedded in the vehicle body in use of the battery cells and battery container on a battery powered vehicle. Therefore, in the case of electrochemical accumulators having metal housings, for reasons of insulation, an interior insulating plastic container is used as a battery container which is subsequently inserted into the above-mentioned end container. For the above-mentioned reasons, the stability of the overall construction is absolutely necessary. Also, for energy reasons, the total weight of a vehicle must be as low as possible in which case, however, as much electrochemical accumulating capacity as possible must exist in a volume that is as small as possible, and the tempering of the cells must be sufficient. Furthermore, because of the constructional circumstances of the motor vehicle body, the vertical height of the battery container is limited within low tolerances.

It is an object of the invention to further develop a battery container on which the type of this invention is based in that, among other things, the tempering of the cells is improved, in which case, while the advantages of the battery container remain the same, the battery container must have an influence on the overall weight of the motor vehicle which is as low as possible.

In the case of a battery container of the above-mentioned type, this object is achieved by providing spacers between layers of cells, which spacers each have a first portion extending in a vertical direction by an amount corresponding to a vertical thickness of respective ones of said battery cells and a plurality of thin spacing strips extending perpendicular to said first portion and serving to abuttingly engage and space respective flat sides of battery cells stacked on top of one another in the container, said spacing strips defining coolant flow channels along facing flat sides of the battery cells adjacent ones of said spacing strips when in an installed position in said container. As a result of the supporting of the cells housings along at least a large portion of the surface of their flat sides, a uniform cross-section of the bypass duct is ensured also in the case of breathing cells.

Furthermore, this support also contributes to the stabilization of the floor structure of the vehicle body and thus, among other things, to an increase of safety in the case of a crash. Also, the whole battery container is stabilized with respect to a low weight requirement, in which case particularly the metallic wall—viewed as a whole—also contributes to the minimizing of the weight of the overall vehicle because the battery container according to the invention does not, as previously, have to be immersed in an additional sheet metal trough.

A special advantage is also the flat bearing of the cells because, thereby, a new layer of cells has a shorter course in the vertical direction. As a result, an increase of the overall capacity of all cells arranged in the battery container can take place with a slight increase of the vertical height of the battery container. In advantageous cases, that is, in the case of an exchangeable battery container, this may take place within specific limits without changes on the body of the motor vehicle since only the battery container has to be changed.

In addition, when cells are to be cooled, the battery container according to the invention also has the advantage that the wall of the battery container is made of metal so that a cooling can also take place by means of the wall.

Other objects, advantages and novel features of the present invention will become apparent from the following detailed description of the invention when considered in conjunction with the accompanying drawings.

DETAILED DESCRIPTION OF THE DRAWINGS

Figure 1:
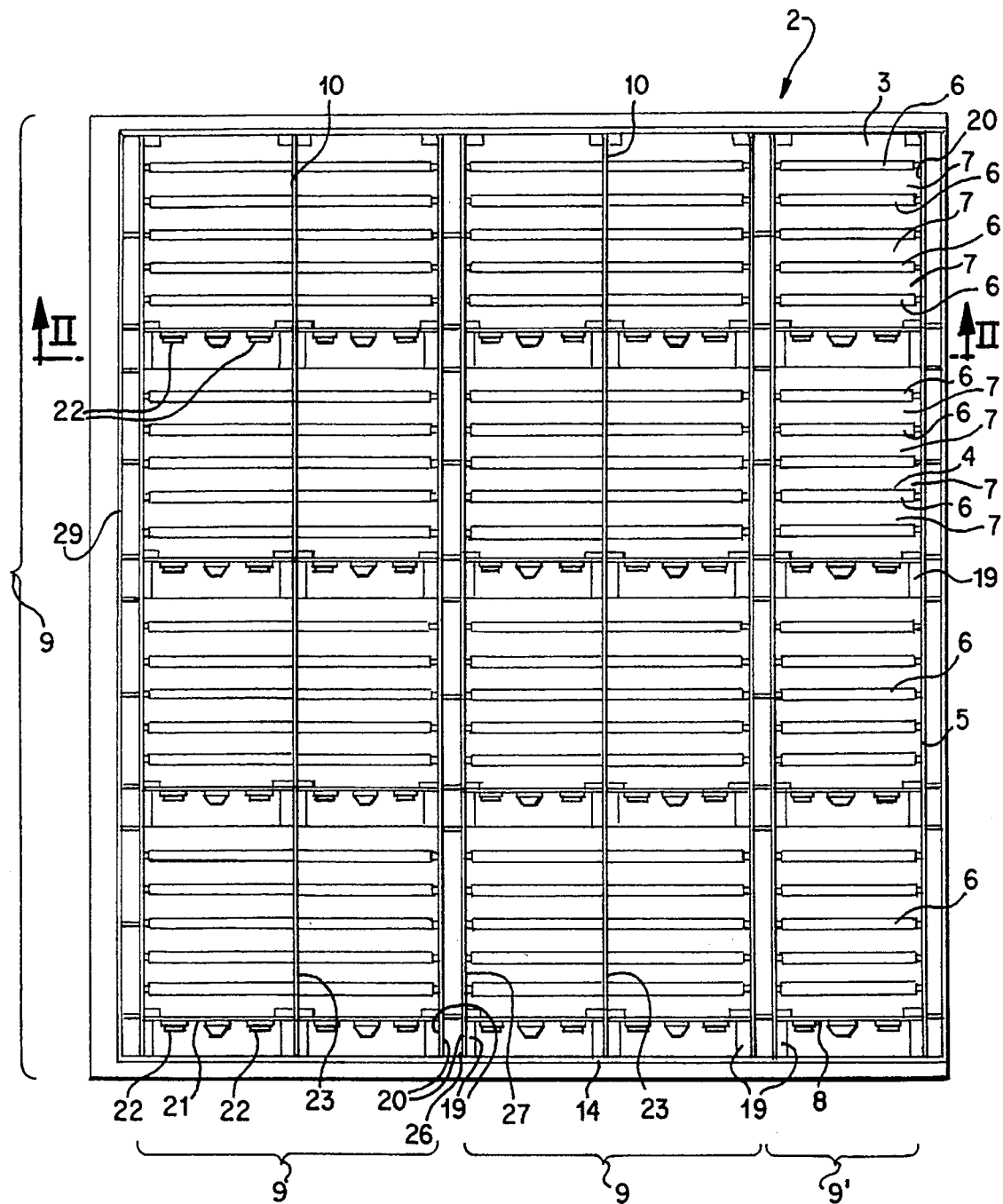
FIG. 1 is a top view of a battery container constructed according to a preferred embodiment of the invention, with a removed lid and a removed first cell layer of cells arranged with their flat side in parallel to the bottom of the battery container.

FIG. 1 is a horizontally extending sectional view of a battery container 2 according to the invention. The battery container 2 is provided for the direct installation into the supporting floor structure 1 of a body of a vehicle. For this purpose, the battery container 2 is installed into an opening or a breakthrough of the floor structure 1 and, particularly along flanges 17 projecting away from it, is sealingly and detachably fastened to the floor structure 1, particularly by means of screws on the edge side, the battery container being expediently embedded in a prefabricated frame. So that, in the case of a crash, the battery container 2 contributes to the stability or accident safety of the vehicle, it is made of a material which is ductile also at low freezing temperatures, particularly of sheet metal, and is dimensioned such in its wall thickness that, although it rips open in the case of a crash in a defined manner, it does not tear open so far that individual cells 3 can fall out of the battery container 2.

The cells 3 arranged in the battery container 2, particularly gas-tight cells 3 and Ni-cells, are inserted by means of their flat side 4 in parallel to the bottom 13 of the battery container 2, 2'. Viewed in the direction of the terminal post side 8 of the cells 3, four cells 3 are arranged behind one another on the base area of the battery container 2, and, viewed in the direction of the narrow side 10 extending transversely with respect to the terminal post side 8, five cells 3 are arranged next to one another. This arrangement is repeated in layers in the upward direction, thus in the vertical direction toward the lid 18 of the battery container, a total of five times. The cells 3 are combined to cell rows 9, the base surface of a cell row 9 being aligned in parallel to the bottom 13 of the battery container 2.

Figure 2:
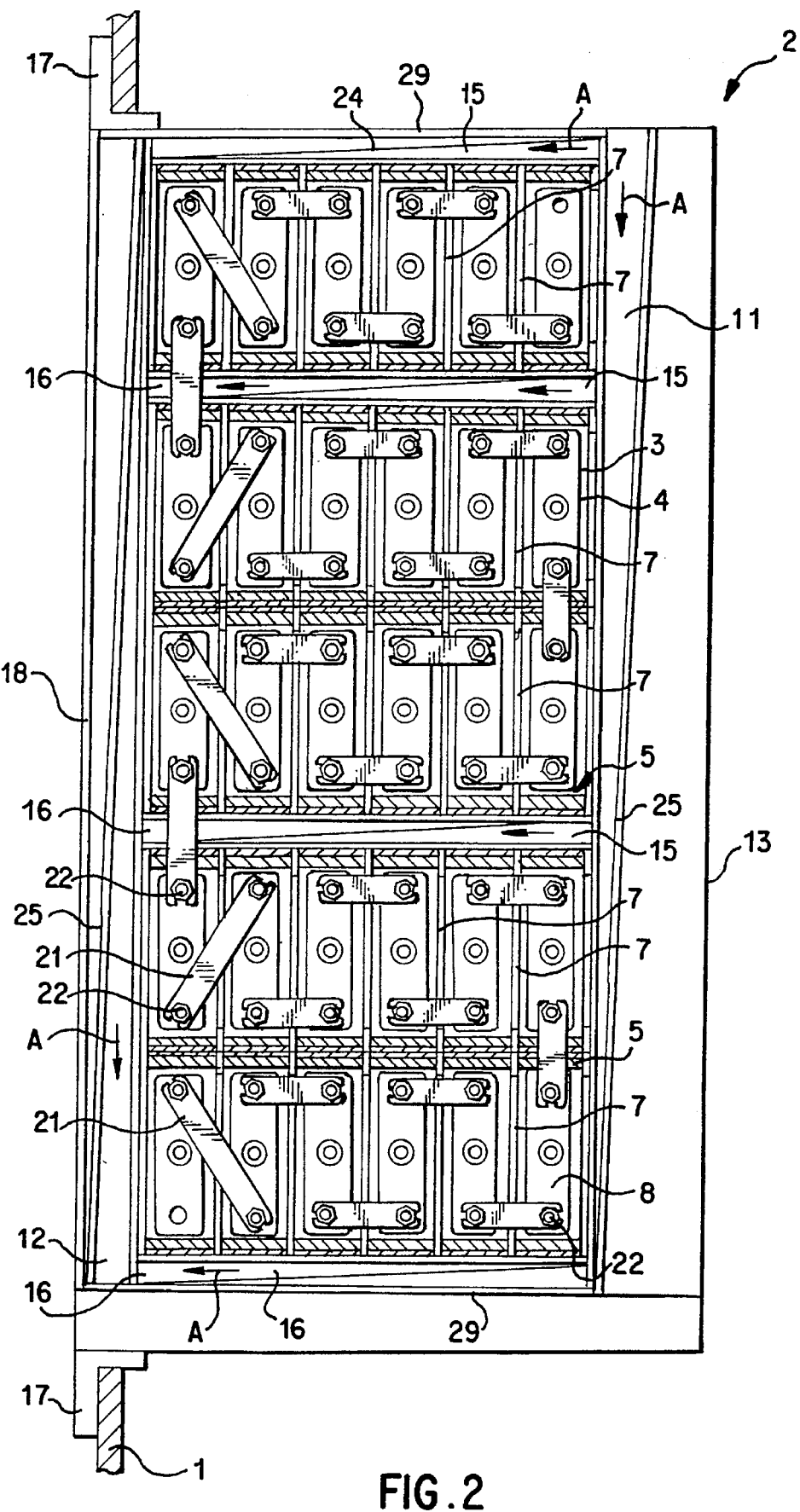
FIG. 2 is a vertically extending sectional view of the battery container of FIG. 1, taken in the direction of line II—II.
Figure 3:
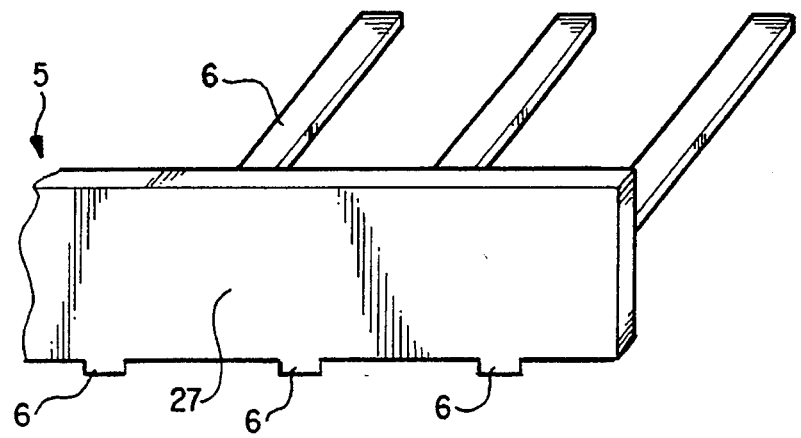
FIG. 3 is an enlarged cut-out in a three-dimensional representation of a spacer for a battery container according to FIG. 1.

In detail, the battery container 2 according to FIG. 1 and 2 has three rows 9, 9' of cells, a base surface of an individual cell row 9' having four individual cells 3 arranged behind one another in the direction of the terminal post side 8. The base surfaces of the two other cell rows 9 are formed by four cell pairs arranged behind one another in the direction of the terminal post side 8 of the cells 3, a cell pair having two cells 3 which are placed directly against one another on their narrow side 10, which cells 3, in the case of cells 3 with metallic cell housings, are electrically insulated from one another on the housing side.

A range spacer 19 is arranged between the terminal post side 8 of a cell 3 and the bottom, which is aligned in parallel thereto, of a cell 3 of a cell row 9 which follows on the terminal side, so that these two sides of the cell housings do not contact one another. As a result, among other things, cell connectors 21, which connect in an electrically conducting manner, the terminals 22 of the individual cells 3 with one another in the desired fashion, can be freely laid.

Figure 4:
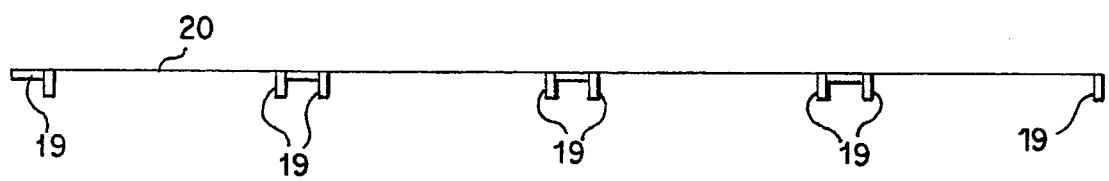
FIG. 4 is a view of an edge range spacer to be arranged on the edge side in the battery container of FIGS. 1 and 2.
Figure 5:
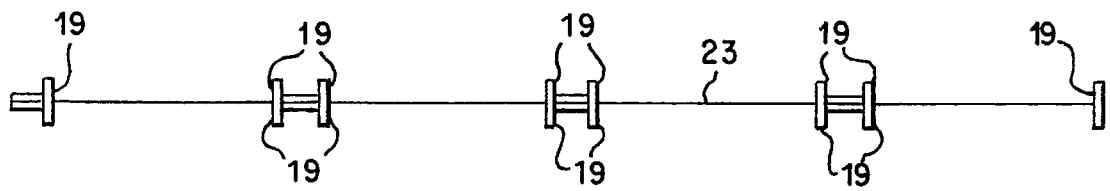
FIG. 5 is a view of a range spacer to be arranged between the narrow sides of the cells in the battery container of FIG. 1.

Advantageously, the range spacers 19 are arranged on range spacing strips 20, in which case a differentiation must be made between an edge-side range spacing strip 20, as illustrated in FIG. 4, and an interior range spacing strip 23 of a different construction which is arranged in the interior of the battery container 2 between two narrow sides 10 of cells 3 because the interior range spacing strip 23 (see FIG. 5) is provided on opposite sides with outwardly projecting range spacers 19, in which case the edge-side range spacing strip 20 has range spacers 19 which project toward the outside only toward one side.

Between the flat sides 4 of the cells 3 of a cell row 9, spacers 5 are arranged so that, between the mutually spaced flat sides 4, a bypass duct 7 is formed which is bounded by them and through which, during the operation, a fluid, particularly air, flows which tempers the cells 3.

For guiding the fluid, the battery container 2 has an inflow duct 11 on the bottom side and an outflow duct 12 on the lid side. The fluid is further guided via respective transverse outflow ducts 16 and transverse inflow ducts 15 which are arranged opposite the bypass ducts 7 and are fluidly connected with one another by the bypass ducts 7. With respect to a cell row 9, 9', the fluid flows via the inflow duct 11 into the transverse inflow duct 15, is distributed from it into the bypass ducts 7 of the cell row 9, 9', in which the strips 6 are aligned in parallel to the flow direction (arrow A), is collected by the transverse outflow duct 16, and is guided to the outflow duct 12 from which it flows out of the battery container 2.

So that each of the bypass ducts 7 of a cell row 9, 9' has an approximately identical volume flow of fluid, the cross-section of the transverse inflow duct 15, through which the flow can take place, decreases in the direction of the flow (arrow A), whereas that of the transverse outflow duct 16 increases in the same manner, the extent of the respective cross-sectional change being coordinated with the outflow of the fluid or the inflow of the fluid from the bypass ducts 7.

For the forming of the transverse inflow ducts 15 and of the transverse outflow ducts 16, two conducting plates 24 are provided between two cell rows 9, 9' which, with respect to the narrow sides 10 of adjoining cell rows 9, 9' are sloped toward the latter. As a result, by means of a conducting plate 24 arranged in the narrow-side clearance, at the same time, a transverse inflow duct 15 for one cell row 9, 9' and a transverse outflow duct 16 for the other adjoining cell row 9, 9' is formed.

Since the inflow duct 11 also supplies several transverse inflow ducts 15 and the outflow duct 12 removes fluid from a corresponding number of transverse outflow ducts 16, the inflow duct 11 as well as the outflow duct 12 also have a cross-section through which the flow can take place which changes in the flow direction (arrow A), in which case the cross-section of the inflow duct 11 narrows in the flow direction (arrow A) and that of the outflow duct 12 widens. In the case of a battery container 2 according to FIG. 1 and 2 and also in the case of the later described battery container 2' according to FIG. 6 and 7, the cross-sectional change of the inflow duct 11 and of the outflow duct 12 is implemented by components, such as fluid conducting plates 25 and/or fluid conducting wedges 26, which are arranged on the bottom 13 or on the lid 18 of the respective battery container 2, 2' and conduct the fluid.

The spacer 5 required for the bypass ducts 7 has a spacing strip 27 from which several strips 6, which are arranged next to one another, project in a transverse manner. The spacing strip 27 of the spacer 5 is placed on a narrow side 10 of the cell housings, whereby the strips 6 project into the bypass duct 7 and are aligned in it by means of their longitudinal course in parallel to the flow direction (arrow A).

In a useful manner, the course of the spacing strip 27 measured in parallel to the narrow sides 10 of the cells 3 corresponds approximately to the corresponding measurement of a cell row 9, 9'. As a result, in the most advantageous case, only one spacing strip 27 is required for each cell layer of a cell row 9, 9' a cell layer corresponding to at least one cell row 9 of cells 3 which are arranged behind one another on the terminal side and to no more than a base surface of a cell row 9, 9' covered with cells 3. In the case of the cell rows 9, which have on their narrow sides 10 cells housings which are arranged directly against one another, in the case of this embodiment, for each cell layer of the cell row 9, a spacer 5 is placed with its spacing strip 27 on each free narrow side 10 in the cell housing. When the cells 3 are placed in the battery container 2 according to FIG. 1, which expediently takes place in the manner of cell layers, the spacers 5 are arranged first, then the cells 3 and subsequently the range spacers 19 which, in certain cases, advantageously may also be integrated on the spacers 5, and then the cell connectors, etc.

The longitudinal course of the strips 6, which is measured in the flow direction (arrow A) of the tempering fluid, corresponds approximately to the cell measurement measured in the flow direction (arrow A), whereby the strips 6 extend over approximately the surface of the flat sides 4. Since, in addition, the height of the strips 6 measured transversely to the flat side 4 of the cell housings is equal to the height of a bypass duct 7, the cells 3 are supported approximately over their whole surface.

The material of the spacers 5, thus of the spacing strips 27 and the strips 6 which are advantageously connected thereto in one piece, is an electric insulator which electrically insulates the flat sides 4 on the housing side with respect to one another. Furthermore, the material of the strips 6 is at most only slightly elastic, whereby the clear cross-section of a bypass duct 7 through which the flow can pass remains almost unchanged even in the case of "breathing" cells 3. A slight elasticity of the material of the strips 6 is advantageous since, as a result, manufacturing tolerances of the battery container 2 and of its components arranged on the interior side, such as cells 3, etc. can be compensated in a simple manner. At the same time, because of their pressure absorption and the diversion of the resulting forces to the supporting floor structure of the vehicle, the interior components contribute to the increase of the overall stability.

Figure 6:
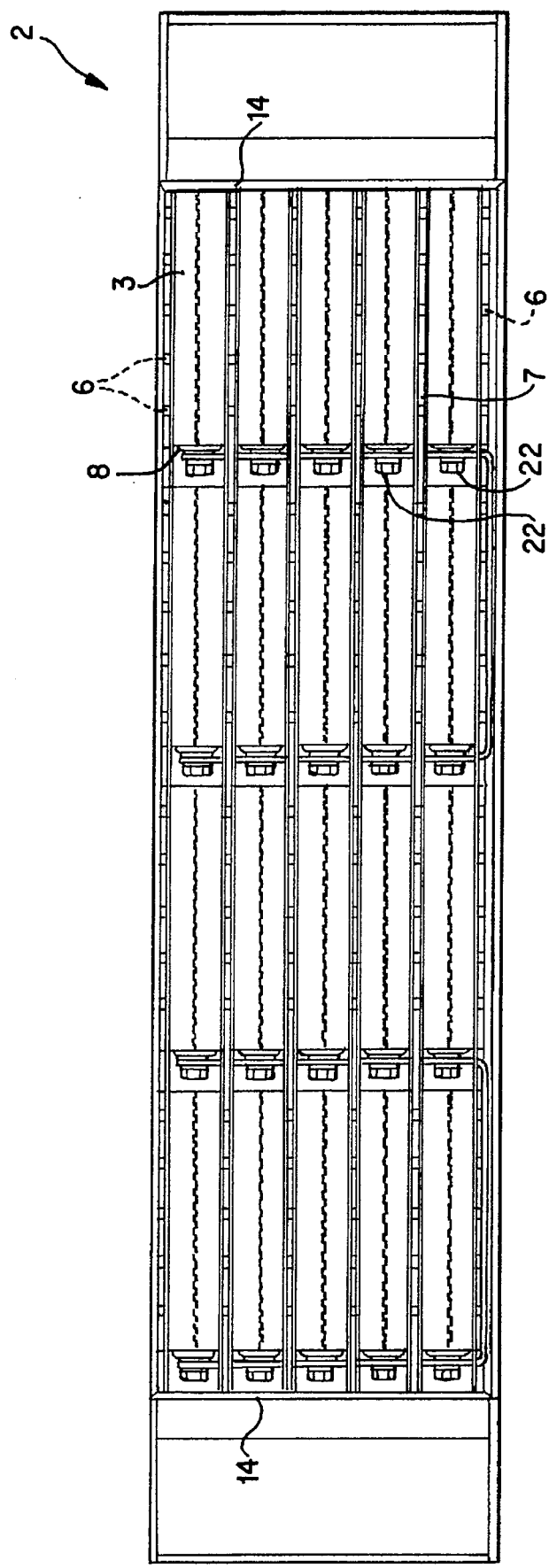
FIG. 6 is a top view of a battery container constructed according to another preferred embodiment of the invention, shown with the lid taken off and the cells are arranged with their flat sides perpendicularly to the bottom of the battery container.

FIG. 6 shows a top view of another battery container 2' while the lid 18 is removed. Like the battery container 2 according to FIG. 1, the battery container 2' according to FIG. 6 is provided for the direct installation into the supporting floor structure 1 of a body of a vehicle. The connection of the battery container 2' with the floor structure 1 of the vehicle and the construction of the exterior-side walls of the battery container 2'take place analogously to the above-described manner.

The cells 3 arranged in the battery container 2', particularly gastight cells and Ni-cells, are arranged in the battery container 2' by means of their narrow sides 10 situated transversely to the flat side 4 and transversely to the terminal post side 8 in parallel to the bottom 13 of the battery container 2'. Viewed in the direction of the terminal post side 8 of the cells 3, on the base surface of the battery container 2', four cells 3 are arranged behind one another and, viewed in the direction of the narrow side 10 extending transversely with respect to the terminal post side 8, five cells 3 are arranged next to one another. This arrangement is repeated in layers, on the whole, it is repeated twice, thus one cell layer after another in the upward direction, that is, in the vertical direction toward the lid. The cells 3 are combined to cell rows 9, the base surface of one cell row 9 being aligned in parallel to the bottom 13 of the battery container 2'.

The narrow sides 10 of the cell housings of a cell row 9 are situated directly against one another, cells 3 with metallic cell housings, on the housing side, being electrically insulated from one another. Between the flat sides 4 of the cells 3, the cell rows 9 have bypass ducts 7 whose clear cross-section through which the flow can take place is ensured by inserted spacers 5 which provide the spaces between the corresponding flat sides 4.

Range spacers 19 are arranged between the terminal post side 8 of a cell 3 and the correspondingly parallel aligned cell bottom of the cell 3 which follows on the terminal side of a cell row 9 so that these two sides of the cell housing will not contact one another. For this purpose, range spacers 19 and/or range spacing strips 20 having range spacers 19 may be used, as described by means of FIGS. 4 and 5.

For conducting the fluid, the battery container 2' has an inflow duct 11 on the bottom side and an outflow duct 12 on the lid side which are fluidly connected with one another by way of bypass ducts 7. The inlet of the fluid is situated in the center in the bottom 13 of the battery container 2' so that two arms of the inflow duct 11 branch off from the inlet which, each by themselves, may be considered to be a partial inflow duct which, in each case, supplies a portion of the cells 3. The clear cross-section of each of these arms of the inflow duct 11 decreases in the flow direction (arrow A) of the fluid, particularly of the air; that is, the cross-section of each of the arms of the inflow duct 11, through which the flow can take place, decreases in the direction of the longitudinal sides 29 of the battery container situated transversely with respect to the front sides 14. Like the inflow duct 11, the lid-side outflow duct 12 is divided into two arms which each start in the center between the longitudinal sides 29 of the battery container 2' and end on the respective front side 14, in which case the clear cross-section of the arms of the outflow duct 12, through which the flow can take place, increases in the direction of the assigned longitudinal side 29.

With respect to a cell row 9, 9' the fluid flows into the inlet, is divided into the arms of the inflow duct 11, from where it arrives in the bypass ducts 7 of the cell row, in which case, per time unit, approximately the same volume flows through each of the bypass ducts 7. From the bypass ducts 7, the fluid arrives in the outflow duct 12 which collects it and by way of which it flows out of the battery container 2'. By means of the design of the arms of the inflow duct 11 and of the arms of the outflow duct 12 which have the described cross-sectional change, the volume flow of the fluid through the bypass ducts 7 and thus the tempering of all cells 3 is approximately equal since the cross-sectional change is coordinated with the respective volume of the flowing fluid.

The spacer 5 required for the bypass ducts 7 has a spacing strip 27 from which several strips 6 project in a transverse manner which are arranged next to one another. The spacing strip 27 of the spacer 5 is placed on a narrow side 10 of the cell housing on each cell layer of a cell row 9, 9'. As a result, the strips 6, which are aligned with their longitudinal course in the flow direction (arrow A) and are arranged approximately equidistantly with respect to one another, project into each of the bypass ducts 7. During the providing of the battery container 2' with cells 3, the spacer 5 is inserted first and only then the cell 3 will be inserted.

As mentioned with respect to the preceding embodiment of FIGS. 1–5, also in this case, the course of the spacing strip 7 measured in parallel to the narrow sides 10 of the cells 3 advantageously corresponds approximately to the corresponding measurement of a cell row 9, 9' whereby, in the most favorable case, for each cell layer of a cell row 9, 9' only one spacing strip 27 is required.

The longitudinal course of the strips 6 measured in the flow direction (arrow A) of the tempering fluid corresponds approximately to the height of a cell row 9, 9' measured in the flow direction (arrow A), whereby the strips 6 cover approximately the surface of the flat sides 4 of the two cells 3 which by means of their narrow side 10 are arranged directly on one another in an electrically insulated manner. Since, in addition, the height of the strips 6 measured transversely with respect to the flat sides 4 of the cell housings is equal to the height of a bypass duct 7, the cells 3 are supported approximately over their whole surface.

Figure 7:
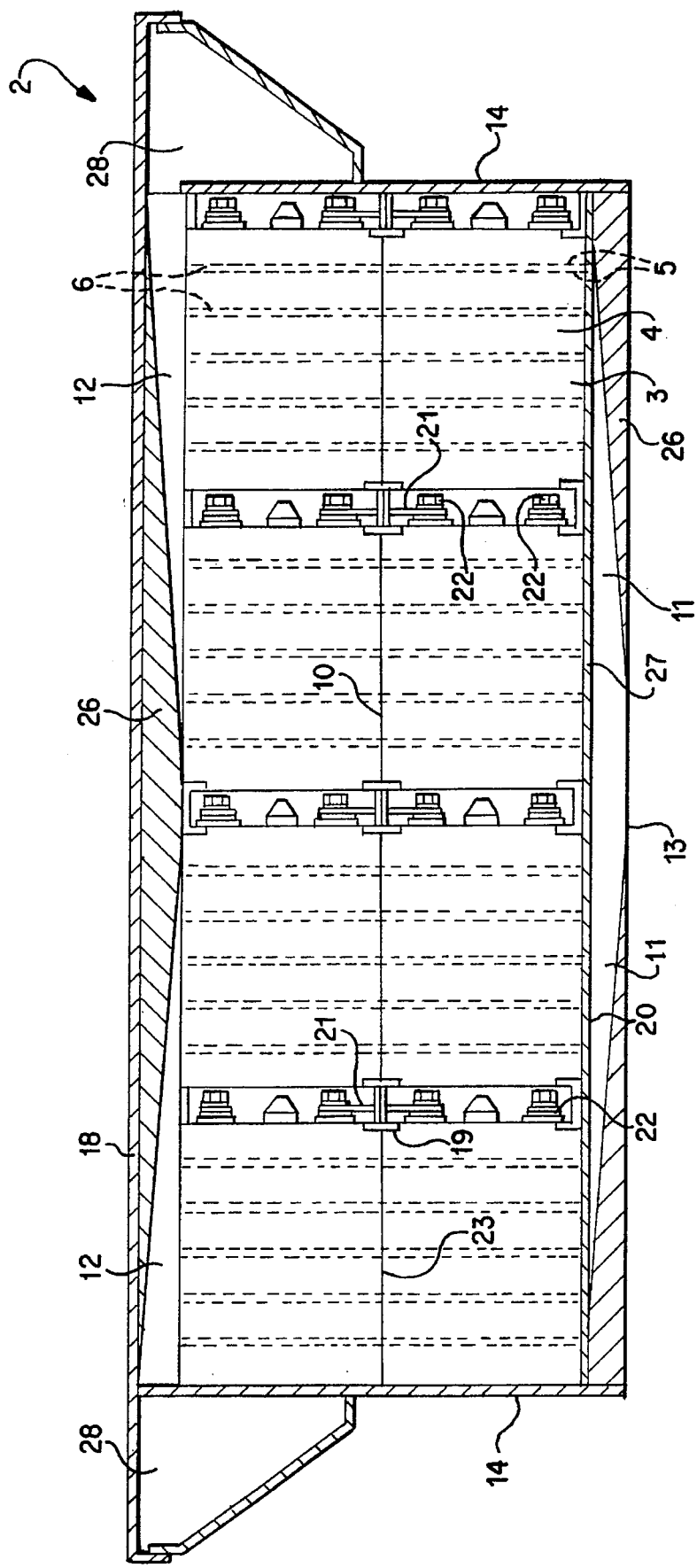
FIG. 7 is a perpendicularly extending sectional view of the battery container according to FIG. 6.

In the two embodiments, it may be useful to arrange on the inlet of the fluid and/or, as illustrated in FIG. 7, on the outlet of the fluid from the battery container 2, 2', a fan 28 and/or a pump which permits a regulating of the total volume of the fluid.

In the case of breathing cells 3, thus, for example, Ni metal hydride cells, which may have an internal pressure of up to 3 bar excess pressure during the operation, it is useful to reinforce the battery containers 2, 2' for increasing the stability which may take place particularly by means of crosstie rods, the respective crosstie rods expediently being placed on two opposite sides of the corresponding battery container 2, 2'.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Battery container for several electrochemical accumulator cells arranged therein, having a wall of the battery container which, on a housing side, is electrically insulated with respect to metallic cell housings of the cells which are electrically connected with one another on a terminal side, and having bypass ducts which are arranged between the flat sides of cell housings of adjacent cells and are bounded at least on one side by the flat sides of these cell housings, the cells being spaced away from one another on the flat side by means of spacers of an electrically insulating material arranged in the area of the cell housing, having an inflow duct which is arranged in an interior of the battery container and is fluidly connected with the bypass ducts and whose clear cross-section is reduced in the flow direction of a fluid flowing through, having an outflow duct which, on the flow side, is arranged to be opposite the inflow duct and is fluidly connected with the inflow duct via the bypass ducts, the clear cross-section of the outflow duct widening in the flow direction, characterized in that the battery container which is fastenable directly into the supporting floor structure of a body of a vehicle in a sealing and detachable manner, is formed of sheet metal, which is ductile at low freezing temperatures, and is dimensioned such in its wall thickness such that it rips open in the case of a crash in a defined manner and does not tear open so far that individual cells can fall out of the battery container, that the spacer spacing the flat sides of the cell housings of the cells has several strips arranged at a distance next to one another whose longitudinal course measured in the flow direction of the fluid corresponds to at least half of the cell measurement measured in the flow direction and which are made of an electrically insulating material, that the cell housings are supported in an electrically insulating manner against the wall of the battery container, and the height of the strips measured transversely to the flat side of a cell housing is equal to the height of a bypass duct, this height corresponding to the desired distance between two adjacent flat sides of cell housings.

2. Battery container according to claim 1, characterized in that, inside the battery container, the cell housings are arranged with respect to the terminal post side of the opposite cell bottom of the cell housing which follows next in the direction of the terminal post side behind one another in an aligned manner in the form of a cell row, and in that at least two cell housings adjoining in the flow direction rest against one another on their common narrow sides in an electrically insulated manner.

3. Battery container according to claim 1, characterized in that the battery container is self-supporting.

4. Battery container according to claim 1, characterized in that the battery container is made of sheet metal.

5. A battery container assembly for holding a plurality of substantially rectangularly shaped battery cells having terminal connectors at respective ends thereof, comprising:

a container bottom and container walls defining a battery cell accommodating space, a plurality of spacers having a first portion extending in a vertical direction by an amount corresponding to a vertical thickness of respective ones of said battery cells and a plurality of thin spacing strips extending perpendicular to said first portion and serving to abuttingly engage and space respective flat sides of battery cells stacked on top of one another in the container, said spacing strips defining coolant flow channels along facing flat sides of the battery cells adjacent ones of said spacing strips when in an installed position in said container.

6. A battery container assembly according to claim 5, wherein said spacers are formed of electrically insulating material.

7. A battery container assembly according to claim 6, wherein separate ones of said spacers are provided for each row of battery cells to be positioned in said container.

8. A battery container assembly according to claim 7, wherein said spacers include a plurality of spacing strips for each battery cell to be stacked in said container.

9. A battery container according to claim 5, comprising edge separators insertable between rows of battery cells to separate terminal connectors of the battery cells from adjacent battery cells.

10. A battery container according to claim 8, comprising edge separators insertable between rows of battery cells to separate terminal connectors of the battery cells from adjacent battery cells.

11. A battery container according to claim 10, wherein said edge separators form portions of coolant flow channels communicating with the coolant flow channels formed by said spacers.

12. A battery container according to claim 11, further comprising coolant fluid inlet channels communicating with said coolant flow channels.

13. A battery container according to claim 5, wherein said spacing strips are configured such that in use the coolant flow channels extend over a majority of the surface area of flat surfaces of battery cells stacked on top of one another in the container.

* * * * *